Oct. 4, 1949.  B. J. WISURI  2,483,687

VEHICLE SIGNAL AND DIRECTIONAL LIGHT

Filed March 9, 1948

Bernard J. Wisuri
INVENTOR.

BY
Clarence A. O'Brien
and Harvey B. Jacobson
Attorneys

Patented Oct. 4, 1949

2,483,687

UNITED STATES PATENT OFFICE 2,483,687

VEHICLE SIGNAL AND DIRECTIONAL LIGHT

Bernard J. Wisuri, Maynard, Mass.

Application March 9, 1948, Serial No. 13,900

1 Claim. (Cl. 177—329)

The present invention relates to new and useful improvements in signals for automobiles and other motor vehicles and more particularly to an electric signal to warn other motorists of the driver's intention to turn either to the right or left, or to stop, or that the driver wishes following motorists to pass.

An important object of the invention is to provide a signal lamp housing for mounting on a suitable part of a vehicle and including a plurality of compartments having individual signalling lamps therein and providing windows in the housing provided with colored glass and carrying suitable indicia, the coloring of the glass corresponding to the character of the signal.

A still further object is to provide a device of this character of simple and practical construction, which is neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
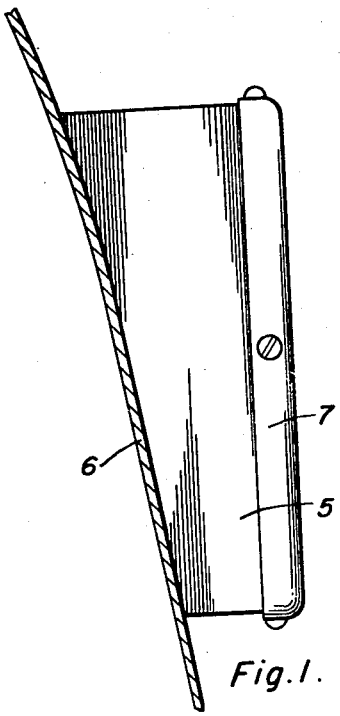
Figure 1 is a side elevational view of the lamp housing shown attached to a part of a vehicle, the latter being broken away and shown in section.
Figure 2:
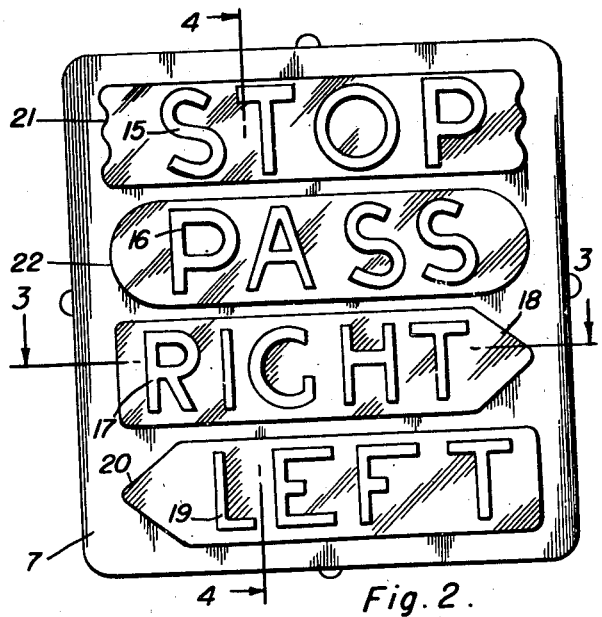
Figure 2 is a front elevational view of the housing.
Figure 4:
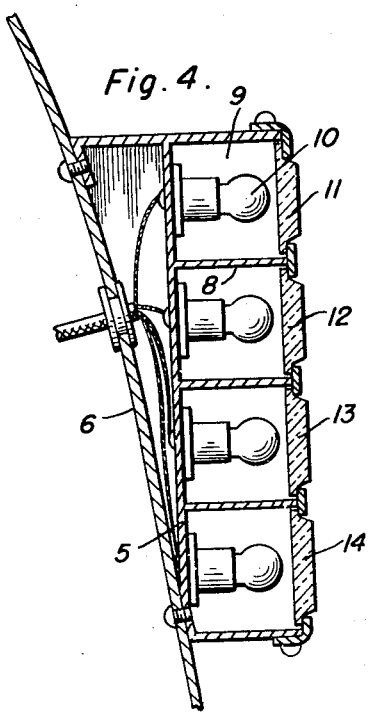
Figure 4 is a vertical sectional view taken substantially on the line 4—4 of Figure 2.
Figure 3:
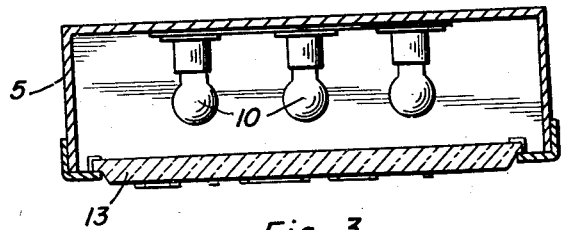
Figure 3 is a horizontal sectional view taken substantially on the line 3—3 of Figure 2.
Figure 5:
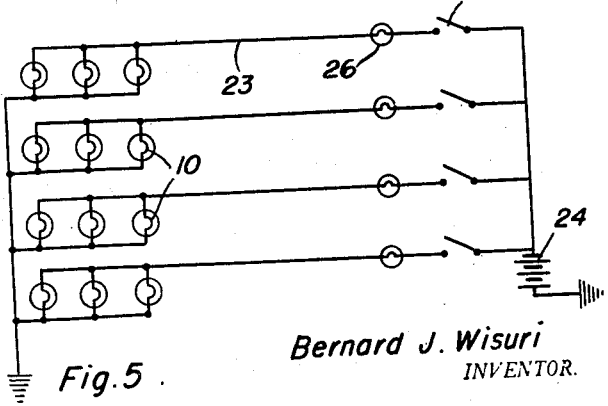
Figure 5 is a diagram of the circuit for the lamps of the individual signalling compartments in the housing.

Referring now to the drawing in detail wherein for the purpose of illustration I have disclosed a preferred embodiment of the invention, the numeral 5 designates a signal lamp housing having its rear portion shaped to conformably fit against a part of an automobile or other motor vehicle 6 for attaching thereto. The front of the housing is provided with a cover 7 and horizontal partitions 8 are provided in the housing to separate the same into a plurality of horizontal compartments 9 positioned one above the other, and in which a plurality of lamps 10 are suitably mounted.

Colored lens plates 11, 12, 13 and 14 are carried by the cover 7 for the respective lamp compartments 9, the lens plate 11 having the word "Stop" 14 printed or otherwise displayed thereon, the lens plate 12 having the word "Pass" 16 similarly displayed thereon, the lens plate 13 having the word "Right" 17 displayed thereon and formed with an arrow 18 at its right end and the lens 14 having the word "Left" 19 displayed thereon and formed with an arrow 20 at its left end.

The lens for the stop sign 15 is of a dark red color, the lens for the pass sign 16 is of a green color, the lens for the right turn 17 is of a yellow color, and the lens for the left turn 19 is of a light red color.

The ends of the lens 11 for the stop signal is jagged at each end as shown at 21 while the ends of the lens 12 for the pass signal are rounded as shown at 22.

The lamps 10 for the several compartments 9 are included in a circuit 23 with the battery 24 of the vehicle and each group of lamps 10 are provided with individual switches 25 mounted at a suitable part of the vehicle adjacent the driver to selectively energize the respective lamps. Signal lights 26 are installed in the circuit, a light 26 being provided for each group of lamps 10 and preferably mounted on the dashboard of the vehicle.

The lamps 10 will illuminate the particular signal associated therewith and the particular color of the lens for such signal will indicate the character of the signal in accordance with the commonly understood warning colors associated with various types of signals.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A vehicle signal comprising a lamp housing including a continuous rectangular sheet of material defining opposed side walls and an upper and lower end wall having front and rear edges, said front edges of the walls terminating in a common plane, the rear edge of the upper end wall being projected beyond the rear edge of the lower end wall, the rear edges of the side walls being slanted inwardly and downwardly from the extended rear edge of the upper end wall to the rear edge of the lower end wall, a partition wall disposed vertically within the walls and extending upwardly from the rear edge of the lower end wall, a plurality of horizontally disposed vertically spaced partition walls extending forwardly of the partition wall and defining lamp compartments, a plurality of lamp sockets disposed serially in each of said compartments, a front member vertically disposed on said housing and formed with a rectangular integral flange, said flange being secured on the front edges of the walls of the housing, said front member being formed with a plurality of horizontally disposed openings, which are disposed in alignment with the lamp compartments, a red colored lens detachably disposed in one of said openings and closing off one of the compartments and having a "stop" signalling indicia displayed thereon, a green colored lens in a second opening and having a "pass" signalling indicia displayed thereon, an amber colored lens disposed in a third compartment and having a "right" turn indicia displayed thereon; and a red colored lens disposed in a fourth compartment and having a "left" turn indicia displayed thereon.

BERNARD J. WISURI.

REFERENCES CITED

The following references are of record in the file of this patent:

UNITED STATES PATENTS

| Number | Name | Date |
| --- | --- | --- |
| 1,640,008 | Norris | Aug. 23, 1927 |
| 1,798,966 | Bully et al. | Mar. 31, 1931 |
| 1,893,371 | Knowlton | Jan. 3, 1933 |
| 2,044,300 | Heans | June 16, 1936 |